(12) United States Patent
Ochiai et al.

(10) Patent No.: US 10,385,768 B2
(45) Date of Patent: Aug. 20, 2019

(54) OUTBOARD MOTOR UNIT AND MARINE VESSEL INCLUDING PLURALITY OF ENGINES AND SHARED SUPERCHARGER

(71) Applicant: YAMAHA HATSUDOKI KABUSHIKI KAISHA, Iwata-shi, Shizuoka (JP)

(72) Inventors: Katsumi Ochiai, Shizuoka (JP); Toshio Suzuki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 91 days.

(21) Appl. No.: 15/709,616

(22) Filed: Sep. 20, 2017

(65) Prior Publication Data

US 2018/0100431 A1  Apr. 12, 2018

(30) Foreign Application Priority Data

Oct. 11, 2016 (JP) ................. 2016-199832

(51) Int. Cl.
| | |
|---|---|
| F02B 39/16 | (2006.01) |
| F02B 29/04 | (2006.01) |
| F02B 73/00 | (2006.01) |
| F02B 37/16 | (2006.01) |
| B63H 20/32 | (2006.01) |
| B63H 23/00 | (2006.01) |
| F02B 61/04 | (2006.01) |

(Continued)

(52) U.S. Cl.
CPC ............ *F02B 39/16* (2013.01); *B63H 20/001* (2013.01); *F02B 29/04* (2013.01); *F02B 37/16* (2013.01); *F02B 61/045* (2013.01); *F02B 73/00* (2013.01); *F02D 29/02* (2013.01); *F02M 35/10255* (2013.01); *F02M 35/167* (2013.01); *B63H 20/00* (2013.01); *B63H 20/32* (2013.01); *B63H 23/00* (2013.01); *B63H 2020/003* (2013.01); *F02B 39/04* (2013.01); *F02B 39/10* (2013.01); *F02D 28/00* (2013.01); *F02M 35/10157* (2013.01); *F02M 35/10268* (2013.01); *Y02T 10/144* (2013.01); *Y02T 10/146* (2013.01)

(58) Field of Classification Search
CPC ............ B63H 2020/003; F02B 73/00; F02B 37/00–24; F02B 61/04; F02D 25/00; Y02T 10/14; Y02T 10/144; B60K 6/00
USPC ................. 60/713–720; 123/DIG. 8
See application file for complete search history.

(56) References Cited

U.S. PATENT DOCUMENTS

| | | | | |
|---|---|---|---|---|
| 1,051,308 A | * | 1/1913 | Buchi | F01B 17/02 123/27 R |
| 1,152,567 A | | 9/1915 | Spear | |

(Continued)

FOREIGN PATENT DOCUMENTS

| | | | | |
|---|---|---|---|---|
| CH | 215808 A | * 7/1941 | ............ | B63H 23/20 |
| DE | 3711863 A1 | * 10/1988 | ............ | B63H 21/14 |

(Continued)

*Primary Examiner* — Laert Dounis
(74) *Attorney, Agent, or Firm* — Keating and Bennett, LLP

(57) ABSTRACT

An outboard motor unit includes a first outboard motor including a supercharger that is located inside a first cowling and supplies compressed air to a first engine, a second outboard motor including a second cowling and a second engine housed in the second cowling, and an air passage through which the air compressed by the supercharger of the first outboard motor is supplied to the second engine of the second outboard motor.

20 Claims, 5 Drawing Sheets

(51) Int. Cl.
    *F02M 35/10*     (2006.01)
    *F02D 29/02*     (2006.01)
    *B63H 20/00*     (2006.01)
    *F02M 35/16*     (2006.01)
    F02D 28/00     (2006.01)
    F02B 39/04     (2006.01)
    F02B 39/10     (2006.01)

(56) References Cited

U.S. PATENT DOCUMENTS

| | | | | |
|---|---|---|---|---|
| 1,880,674 | A * | 10/1932 | Bauer | F02B 33/00 123/1 R |
| 4,787,207 | A * | 11/1988 | Kristensen | F02D 23/00 60/710 |
| 5,155,999 | A * | 10/1992 | Hashimoto | F02B 33/44 60/611 |
| 2004/0121666 | A1* | 6/2004 | Okuyama | B63H 21/22 440/85 |
| 2011/0253076 | A1 | 10/2011 | Mikame et al. | |
| 2012/0244761 | A1* | 9/2012 | Davidson | B63H 20/12 440/61 S |
| 2015/0047341 | A1* | 2/2015 | Ulrey | F02B 29/04 60/600 |
| 2017/0058760 | A1* | 3/2017 | Shor | F02B 37/04 |

FOREIGN PATENT DOCUMENTS

| | | | | |
|---|---|---|---|---|
| DE | 102004029286 | A1 * | 12/2006 | F02B 37/164 |
| FR | 2.029.137 | A5 | 10/1970 | |
| GB | 1 266 301 | A | 3/1972 | |
| JP | 2011-226390 | A | 11/2011 | |

* cited by examiner

OUTBOARD MOTOR UNIT AND MARINE VESSEL INCLUDING PLURALITY OF ENGINES AND SHARED SUPERCHARGER

CROSS REFERENCE TO RELATED APPLICATIONS

This application claims the benefit of priority to Japanese Patent Application No. 2016-199832 filed on Oct. 11, 2016. The entire contents of this application are hereby incorporated herein by reference.

BACKGROUND OF THE INVENTION

1. Field of the Invention

The present invention relates to an outboard motor unit including an outboard motor that includes a supercharger and also relates to a marine vessel including the outboard motor unit.

2. Description of the Related Art

An outboard motor including a supercharger is known in general. Such an outboard motor is disclosed in Japanese Patent Laid-Open No. 2011-226390, for example.

Japanese Patent Laid-Open No. 2011-226390 discloses an outboard motor including a cowling that includes an engine cover or the like, an engine housed in the cowling, and a turbocharger (supercharger) that is housed in the cowling and supplies compressed air to the engine. The outboard motor described in Japanese Patent Laid-Open No. 2011-226390 includes the supercharger, and hence the outboard motor may be increased in size and weight as compared with an outboard motor including no supercharger.

When a plurality of outboard motors each including the supercharger described in Japanese Patent Laid-Open No. 2011-226390 is mounted on a vessel body, the supercharger is located in each of the outboard motors, and hence an outboard motor unit including the plurality of outboard motors is disadvantageously further increased in size and weight.

SUMMARY OF THE INVENTION

Preferred embodiments of the present invention provide an outboard motor unit including a plurality of outboard motors, in which an increase in its size and weight is significantly reduced or prevented while air is supplied to engines of the plurality of outboard motors and a marine vessel including the outboard motor unit.

An outboard motor unit according to a preferred embodiment of the present invention includes a first outboard motor including a first cowling, a first engine housed in the first cowling, and a supercharger inside the first cowling and that supplies compressed air to the first engine, a second outboard motor including a second cowling and a second engine housed in the second cowling, and an air passage through which the air compressed by the supercharger of the first outboard motor is supplied to the second engine of the second outboard motor.

An outboard motor unit according to a preferred embodiment of the present invention includes the air passage through which the air compressed by the supercharger of the first outboard motor is supplied to the second engine of the second outboard motor. Thus, the compressed air is supplied from the supercharger of the first outboard motor to the second engine of the second outboard motor without providing a supercharger in the second outboard motor, and hence the second outboard motor is reduced in size and weight as compared with the case where a supercharger is provided in the second outboard motor. Consequently, an increase in the size and weight of the outboard motor unit including the first outboard motor and the second outboard motor is significantly reduced or prevented while the compressed air is supplied to both the first engine of the first outboard motor and the second engine of the second outboard motor.

An outboard motor unit according to a preferred embodiment of the present invention preferably further includes a cooler downstream of the supercharger and that cools the air compressed by the supercharger, and the air compressed and cooled by the supercharger and the cooler is preferably supplied to the first engine of the first outboard motor and the second engine of the second outboard motor. Accordingly, the compressed air is cooled by the cooler such that the density of the compressed air to be introduced into the first engine and the second engine is increased, and hence the drive force (engine performance) of the first engine and the second engine is increased. In addition, when the cooler is shared by the first and second outboard motors, an increase in the size and weight of the outboard motor unit is further significantly reduced or prevented.

An outboard motor unit according to a preferred embodiment of the present invention preferably further includes an air distributor that distributes the air compressed by the supercharger of the first outboard motor to the first engine and the second engine. Accordingly, an appropriate amount of air is supplied to the first engine and the second engine by the air distributor. Consequently, the drive force of the first outboard motor and the drive force of the second outboard motor are appropriately controlled.

In this case, the air distributor preferably includes a regulator valve that adjusts an amount of the compressed air that flows through the air passage and an opening degree controller that adjusts an opening degree of the regulator valve. Accordingly, the drive force of the first outboard motor and the drive force of the second outboard motor are more appropriately controlled by the regulator valve and the opening degree controller.

In the structure in which the air distributor includes the regulator valve and the opening degree controller, a first controller in the first outboard motor preferably includes the opening degree controller and the first controller is configured or programmed to control driving of the first engine. Accordingly, the first controller that controls the driving of the first engine also functions as the opening degree controller that adjusts the opening degree of the regulator valve such that the number of components in the outboard motor unit is reduced as compared with the case where the opening degree controller is provided separately from the first controller that controls the driving of the first engine.

In the structure in which the first controller includes the opening degree controller, the second outboard motor preferably further includes a second controller configured or programmed to communicate with the first controller and to control driving of the second engine, and the first controller is preferably configured or programmed to adjust the opening degree of the regulator valve based on an operating condition of the first engine and an operating condition of the second engine transmitted from the second controller. Accordingly, an appropriate amount of air is supplied to the first engine and the second engine to correspond to the operating condition of the first engine and the operating condition of the second engine, respectively. Consequently, the drive force of the first outboard motor and the drive force of the second outboard motor are more appropriately controlled.

An outboard motor unit according to a preferred embodiment of the present invention preferably further includes a third outboard motor including a third cowling and a third engine housed in the third cowling, and the air compressed by the supercharger of the first outboard motor is preferably supplied not only to the second engine of the second outboard motor but also to the third engine of the third outboard motor through the air passage. Accordingly, the compressed air is supplied from the supercharger of the first outboard motor to the second engine of the second outboard motor and the third engine of the third outboard motor without providing a supercharger in the second and third outboard motors, and hence the second and third outboard motors are reduced in size and weight as compared with the case where a supercharger is provided in each of the second and third outboard motors. Consequently, an increase in the size and weight of the outboard motor unit including the first, second, and third outboard motors is significantly reduced or prevented while compressed air is supplied to each of the first engine of the first outboard motor, the second engine of the second outboard motor, and the third engine of the third outboard motor.

In this case, the first outboard motor is preferably located between the second outboard motor and the third outboard motor. Accordingly, the compressed air is easily distributed to the second outboard motor and the third outboard motor through the air passage.

In an outboard motor unit according to a preferred embodiment of the present invention, the first outboard motor preferably further includes a main passage through which the air compressed by the supercharger is supplied to the first engine, and the air passage preferably includes a branch passage connected to a portion of the main passage downstream of the supercharger. Accordingly, the compressed air that flows through the main passage is easily supplied to the second engine of the second outboard motor through the branch passage.

In this case, an outboard motor unit according to a preferred embodiment of the present invention preferably further includes a cooler upstream of a connection position between the branch passage and the main passage and downstream of the supercharger in the main passage inside the first cowling and that cools the air compressed by the supercharger, and the air compressed and cooled by the supercharger and the cooler is preferably supplied from the first outboard motor to the first engine of the first outboard motor and the second engine of the second outboard motor. Accordingly, it is not necessary to provide a cooler in the second outboard motor, and hence the second outboard motor is further reduced in size and weight. Consequently, an increase in the size and weight of the outboard motor unit is further significantly reduced or prevented. Furthermore, the cooler that cools the air compressed by the supercharger is provided in the first outboard motor such that the density of the compressed air to be supplied to the first engine and the second engine is increased. Consequently, the drive force (engine performance) of the first engine and the second engine is increased.

In the structure in which the first controller includes the opening degree controller, an outboard motor unit according to a preferred embodiment of the present invention preferably further includes an air distributor that distributes the air compressed by the supercharger of the first outboard motor to the first engine and the second engine and a first bypass passage that connects a portion of the main passage downstream of the cooler to a portion of the main passage upstream of the supercharger and returns the air compressed by the supercharger to the supercharger, and the air distributor preferably includes a first regulator valve in the first bypass passage and that adjusts an amount of the compressed air that flows through the air passage by adjusting the flow of the air in the first bypass passage and an opening degree controller that adjusts an opening degree of the first regulator valve. Accordingly, the opening degree of the first regulator valve in the first bypass passage is adjusted such that the drive force of the first outboard motor is appropriately controlled. In addition, the first regulator valve is opened to allow excessively compressed air to escape through the first bypass passage. Thus, any supply of excessively compressed air to the first engine is significantly reduced or prevented.

In the structure including the first bypass passage and the first regulator valve, both the first bypass passage and the first regulator valve are preferably provided inside the first cowling of the first outboard motor. Accordingly, the first bypass passage is located in the vicinity of the supercharger, and hence the first bypass passage is easily shortened.

In the structure including the first bypass passage and the first regulator valve, an outboard motor unit according to a preferred embodiment of the present invention preferably further includes a second bypass passage that connects the branch passage to the portion of the main passage upstream of the supercharger and returns the air compressed by the supercharger to the supercharger, the air distributor preferably includes a second regulator valve in the second bypass passage and that adjusts the amount of the compressed air that flows through the air passage by adjusting flow of the air in the second bypass passage, and an opening degree of the second regulator valve is preferably adjusted by the opening degree controller. Accordingly, in addition to the opening degree of the first regulator valve in the first bypass passage, the opening degree of the second regulator valve in the second bypass passage is adjusted such that not only the drive force of the first outboard motor but also the drive force of the second outboard motor is appropriately controlled. Furthermore, the second regulator valve is opened to allow excessively compressed air to escape through the second bypass passage. Thus, any supply of excessively compressed air to the second engine is significantly reduced or prevented.

In the structure in which the second outboard motor includes the second bypass passage and the second regulator valve, the first controller provided in the first outboard motor preferably includes the opening degree controller and is configured or programmed to control driving of the first engine, the second outboard motor preferably further includes a second controller configured or programmed to communicate with the first controller and to control driving of the second engine, and the first controller is preferably configured or programmed to adjust the opening degree of the first regulator valve and the opening degree of the second regulator valve based on an operating condition of the first engine and an operating condition of the second engine transmitted from the second controller. Accordingly, the opening degree of the first regulator valve and the opening degree of the second regulator valve are adjusted to correspond to the operating condition of the first engine and the operating condition of the second engine such that an appropriate amount of air is supplied to each of the first engine and the second engine. Consequently, the drive force of the first outboard motor and the drive force of the second outboard motor are more appropriately controlled.

In the structure in which the second outboard motor includes the second bypass passage and the second regulator valve, an outboard motor unit according to a preferred embodiment of the present invention preferably further includes a first check valve upstream of a connection position between the main passage and the first bypass passage and downstream of the connection position in the main passage between the branch passage and the main passage and that prevents backflow of the compressed air, and a second check valve upstream of a connection position between the branch passage and the second bypass passage and downstream of the connection position in the branch passage between the branch passage and the main passage and that prevents backflow of the compressed air. Accordingly, backflow of the compressed air is prevented by the first check valve such that the amount of air to be supplied to the first engine of the compressed air that has passed through the first check valve is reliably controlled by the first regulator valve. Similarly, backflow of the compressed air is prevented by the second check valve such that the amount of air to be supplied to the second engine of the compressed air that has passed through the second check valve is reliably controlled by the second regulator valve.

In the structure including the first regulator valve and the second regulator valve, both the first check valve and the second check valve are preferably provided inside the first cowling of the first outboard motor. Accordingly, the first check valve and the second check valve are located in the vicinity of the connection position between the branch passage and the main passage, and hence the main passage and the branch passage are easily shortened.

In the structure in which the second outboard motor includes the second bypass passage and the second regulator valve, both the second bypass passage and the second regulator valve are preferably provided inside the first cowling of the first outboard motor. Accordingly, the second bypass passage is located in the vicinity of the supercharger, and hence the second bypass passage is easily shortened.

In the structure including the cooler, the cooler preferably includes a first cooler downstream of the supercharger in the first cowling and that cools the air compressed by the supercharger and a second cooler in the second cowling and that cools the compressed air supplied from the supercharger of the first outboard motor. Accordingly, the compressed air to be supplied to the first and second engines is sufficiently cooled by the first cooler and the second cooler without increasing the size of the first cooler to sufficiently cool the compressed air. Furthermore, the second cooler is provided inside the second cowling where the second engine is located such that the air cooled by the second cooler is quickly supplied to the second engine, and hence warming of the cooled air due to the surrounding environment or the like is significantly reduced or prevented. Consequently, the density of the air to be supplied to the second engine is reliably increased.

A marine vessel according to a preferred embodiment of the present invention includes a vessel body and an outboard motor unit mounted on the vessel body, and the outboard motor unit includes a first outboard motor including a first cowling, a first engine housed in the first cowling, and a supercharger inside the first cowling and that supplies compressed air to the first engine, a second outboard motor including a second cowling and a second engine housed in the second cowling, and an air passage through which the air compressed by the supercharger of the first outboard motor is supplied to the second engine of the second outboard motor.

In a marine vessel according to a preferred embodiment of the present invention, the air passage through which the air compressed by the supercharger of the first outboard motor is supplied to the second engine of the second outboard motor is provided in the outboard motor unit. Thus, similarly to the outboard motor unit according to preferred embodiments of the present invention described above, an increase in the size and weight of the outboard motor unit including the first outboard motor and the second outboard motor is significantly reduced or prevented while compressed air is supplied to both the first engine of the first outboard motor and the second engine of the second outboard motor.

In a marine vessel according to a preferred embodiment of the present invention, the outboard motor unit preferably further includes a cooler downstream of the supercharger and that cools the air compressed by the supercharger, and the air compressed and cooled by the supercharger and the cooler is preferably supplied to the first engine of the first outboard motor and the second engine of the second outboard motor. Accordingly, the compressed air is cooled by the cooler such that the density of the compressed air to be introduced into the first engine and the second engine is increased, and hence the drive force (engine performance) of the first engine and the second engine is increased. In addition, when the cooler is shared by the first and second outboard motors, an increase in the size and weight of the outboard motor unit is further significantly reduced or prevented.

The above and other elements, features, steps, characteristics and advantages of preferred embodiments of the present invention will become more apparent from the following detailed description of the preferred embodiments with reference to the attached drawings.

DETAILED DESCRIPTION OF THE PREFERRED EMBODIMENTS

Preferred embodiments of the present invention are hereinafter described with reference to the drawings.

First Preferred Embodiment

The structure of a marine vessel 100 including an outboard motor unit 1 according to a first preferred embodiment of the present invention is now described with reference to FIGS. 1 and 2. In the figures, arrow FWD represents the forward movement direction of the marine vessel 100, and arrow BWD represents the backward movement direction of the marine vessel 100. In the figures, arrow R represents the starboard direction of the marine vessel 100, and arrow L represents the portside direction of the marine vessel 100.

Figure 1:
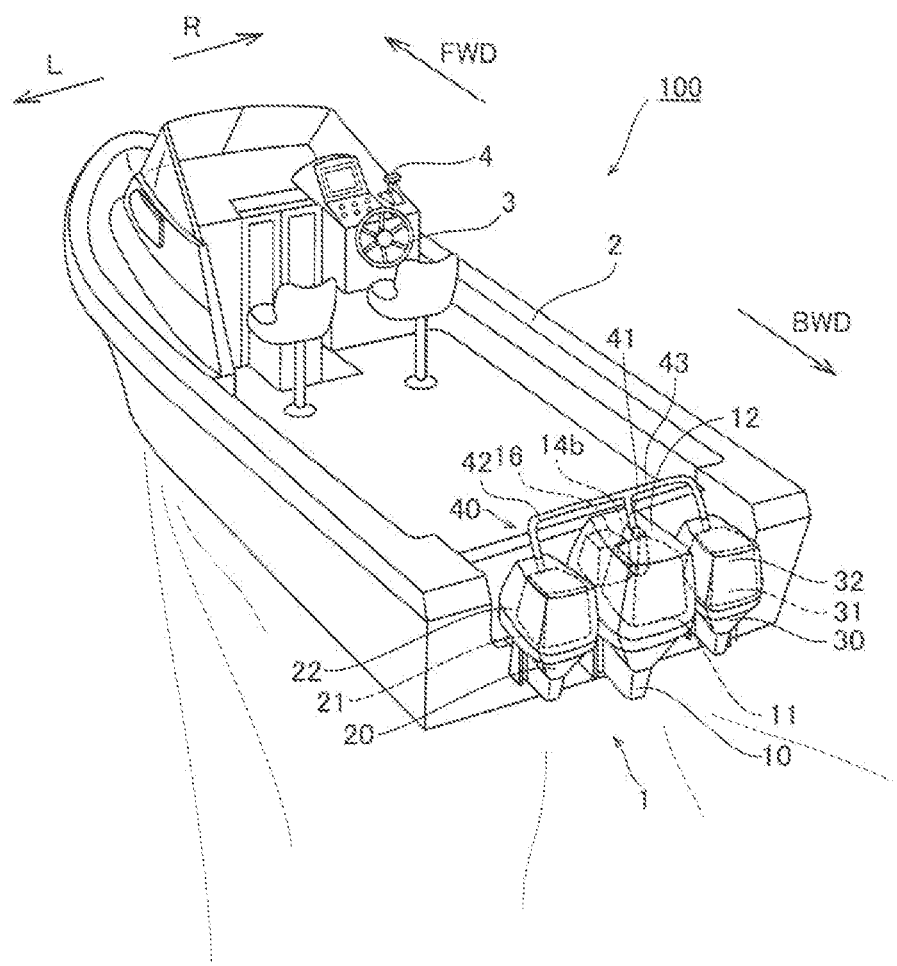
FIG. 1 is a perspective view schematically showing a marine vessel including an outboard motor unit according to a first preferred embodiment of the present invention.

As shown in FIG. 1, the marine vessel 100 includes an outboard motor unit 1 including a plurality of (three, for example) outboard motors 10, 20, and 30, a vessel body 2, a steering wheel 3, and a remote controller 4. In other words, the marine vessel 100 is a marine vessel including a plurality of outboard motors. The outboard motors 10, 20, and 30 are examples of a "first outboard motor", a "second outboard motor", and a "third outboard motor", respectively.

The steering wheel 3 steers the vessel body 2 (turns the outboard motors 10, 20, and 30). Specifically, the steering wheel 3 is connected to each of steering devices (not shown) of the outboard motors 10, 20, and 30. The steering devices rotate the outboard motors 10, 20, and 30 in a horizontal direction based on the operation of the steering wheel 3.

The remote controller 4 manipulates the shifts and outputs (throttle opening degrees) of the outboard motors 10, 20, and 30. Specifically, the remote controller 4 is electrically connected to each of the outboard motors 10, 20, and 30. The outputs and the shifts (forward movement, reverse movement, or neutral) of the outboard motors 10, 20, and 30 are controlled based on the operation of the remote controller 4.

As described above, the outboard motor unit 1 includes the outboard motors 10, 20, and 30 and an air passage 40. The outboard motors 10, 20, and 30 of the outboard motor unit 1 each are mounted on a rear portion of the vessel body 2. In the outboard motor unit 1, the outboard motors 20 and 30 are mounted on the port side and the starboard side with respect to the outboard motor 10, respectively, to locate the outboard motor 10 therebetween. The air passage 40 includes a pipe that connects the outboard motor 10 to the outboard motors 20 and 30, and air (intake air) flows through the air passage 40.

The outboard motor 10 includes an engine 11, a cowling 12 in which the engine 11 is housed, and an ECU (engine control unit) 13 and an air intake 14 located inside the cowling 12. The engine 11 is an internal combustion engine that generates a thrust force to move the marine vessel 100 by rotationally driving a propeller (not shown) by burning an air-fuel mixture in which air (intake air) and fuel are mixed. The ECU 13 controls not only the engine 11 but also the entire outboard motor 10. The air intake 14 supplies air to the engine 11. The engine 11 and the cowling 12 are examples of a "first engine" and a "first cowling", respectively, and the ECU 13 includes functions of an "air distributor", an "opening degree controller", or a "first controller".

The outboard motor 20 includes an engine 21, a cowling 22 in which the engine 21 is housed, and an ECU 23 located inside the cowling 22. Similarly, the outboard motor 30 includes an engine 31, a cowling 32 in which the engine 31 is housed, and an ECU 33 located inside the cowling 32. The engines 21 and 31 are internal combustion engines that generate a thrust force to move the marine vessel 100 by rotationally driving propellers (not shown) by burning an air-fuel mixture in which air (intake air) and fuel are mixed. The engines 21 and 31 are examples of a "second engine" and a "third engine", respectively. The cowlings 22 and 32 are examples of a "second cowling" and a "third cowling", respectively. The ECU 23 is an example of a "second controller".

The ECU 23 controls not only the engine 21 but also the entire outboard motor 20. Similarly, the ECU 33 controls not only the engine 31 but also the entire outboard motor 30. The ECUs 23 and 33 each communicate with the ECU 13 of the outboard motor 10. As a communication method, wired communication or wireless communication may be used. Thus, the ECU 13 receives the operating conditions of the engines 21 and 31 based on information transmitted from the ECUs 23 and 33. In FIG. 2, this communication is indicated by two-dot chain lines.

The outboard motor 10 includes a supercharger 16 and an intercooler 14b such that the outboard motor 10 is larger in size and weight than the outboard motors 20 and 30 that do not include a supercharger or an intercooler.

The air passage 40 includes a branch passage 41 that passes through the cowling 12 of the outboard motor 10 and re-branch passages 42 and 43 that branch from the branch passage 41. A portion of the air passage 40 is located outside the outboard motors 10, 20, and 30. The portion of the air passage located outside the outboard motors 10, 20, and 30 preferably includes a flexible pipe. Thus, even when the outboard motors 10, 20, and 30 are rotated in the horizontal direction, the air passage 40 is flexibly deformed along with the rotation. Consequently, leakage of air from the pipe that the air passage 40 includes due to the rotation of the outboard motors 10, 20, and 30 is significantly reduced or prevented.

According to the first preferred embodiment, compressed and cooled air is supplied from the outboard motor 10 to the engine 21 of the outboard motor 20 and the engine 31 of the outboard motor 30. Specifically, the air compressed by the supercharger 16 of the air intake 14 of the outboard motor 10 and cooled by the intercooler 14b is supplied from the outboard motor 10 to the engine 21 of the outboard motor 20 and the engine 31 of the outboard motor 30 through the air passage 40. That is, the intercooler 14b is shared by the outboard motors 10, 20, and 30. The structure of the air intake 14 is described in detail below.

Figure 2:
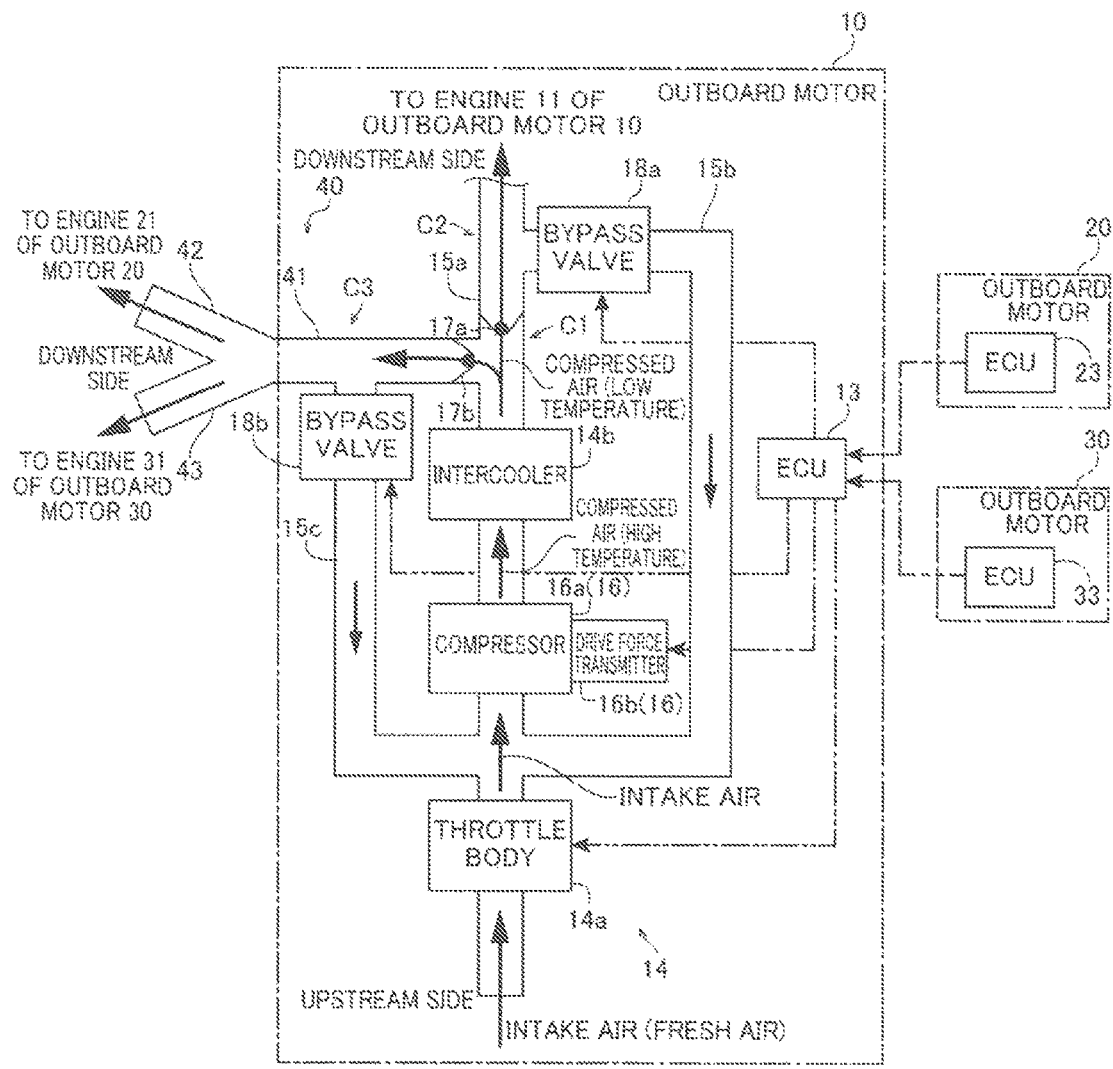
FIG. 2 is a diagram schematically showing the outboard motor unit according to the first preferred embodiment of the present invention.

As shown in FIG. 2, the air intake 14 includes an air passage 15 through which air (intake air) flows and a throttle body 14a, the supercharger 16, and the intercooler 14b located along the air passage 15. The air passage 15 includes a main passage 15a, the branch passage 41 that branches from the main passage 15a, and two bypass passages 15b and 15c. The intercooler 14b is an example of a "cooler". The bypass passages 15b and 15c are examples of a "first bypass passage" and a "second bypass passage", respectively.

Air (intake air) is introduced into the main passage 15a through an air cleaner (not shown). The air introduced into the main passage 15a is supplied to the engine 11 through the main passage 15a. In the main passage 15a, the throttle body 14a, the supercharger 16, and the intercooler 14b are located in this order from the upstream side to the downstream side. The throttle body 14a adjusts the amount (air amount) of air (intake air) to be supplied to the supercharger 16 by adjusting the amount of air to be introduced therein.

The supercharger 16 preferably includes a so-called mechanical compressor 16a that compresses air and a drive force transmitter or transmission 16b that transmits a drive force to drive the compressor 16a. The compressor 16a may be of a centrifugal type, Roots type, screw type, rotary type, or the like.

The drive force transmitter 16b acquires a drive force from the engine 11 of the outboard motor 10. The drive force transmitter 16b may transmit a drive force from a drive source other than the engine 11, such as an electric motor, to the compressor 16a. In this case, the drive force transmitter 16b drives the compressor 16a with a drive force obtained by adjusting the magnitude of the drive force from the drive source based on the control by the ECU 13.

The intercooler 14b cools the air (high-temperature compressed air) compressed by the supercharger 16 using water, for example. Specifically, in the intercooler 14b, heat exchange is performed between the high-temperature compressed air that flows through the intercooler 14b and the water pumped up by a pump (not shown) through a heat radiator such as a fin. Consequently, in the intercooler 14b, the high-temperature compressed air is cooled. That is, the intercooler 14b is water-cooled. The temperature of the air to be supplied to the engine 11 of the outboard motor 10, the engine 21 of the outboard motor 20, and the engine 31 of the outboard motor 30 is lowered by the intercooler 14b such that the density of the air is sufficiently increased.

A portion of the compressed and cooled air (low-temperature compressed air) that flows through the main passage 15a is supplied (distributed) to the outboard motors 20 and 30 through the branch passage 41. A first end of the branch passage 41 is connected to the main passage 15a at a connection position C1 downstream of the intercooler 14b. A second end of the branch passage 41 branches into the two re-branch passages 42 and 43. The first end of the branch passage 41 is connected to the main passage 15a inside the cowling 12, and the second end of the branch passage 41 is connected to the re-branch passages 42 and 43 outside the cowling 12, 22, and 32.

A portion of the compressed and cooled air that flows through the main passage 15a is returned to the supercharger 16 through the bypass passage 15b. A first end of the bypass passage 15b is connected to the main passage 15a at a connection position C2 downstream of the connection position C1 between the branch passage 41 and the main passage 15a (downstream of the intercooler 14b). A second end of the bypass passage 15b is connected to a portion of the main passage 15a upstream of the supercharger 16. The bypass passage 15b is preferably located inside the cowling 12.

A portion of the compressed and cooled air that flows through the branch passage 41 is returned to the supercharger 16 through the bypass passage 15c. A first end of the bypass passage 15c is connected to the branch passage 41 at a connection position C3 downstream of the connection position C1 (downstream of the intercooler 14b). A second end of the bypass passage 15c is connected to the portion of the main passage 15a upstream of the supercharger 16. The bypass passage 15c is preferably located inside the cowling 12.

The main passage 15a and the branch passage 41 include check valves 17a and 17b, respectively. The check valve 17a is located in the main passage 15a downstream of the connection position C1 and upstream of the connection position C2. The check valve 17b is located in the branch passage 41 downstream of the connection position C1 and upstream of the connection position C3. Both the check valves 17a and 17b prevent the compressed and cooled air from flowing back to the connection position C1. The check valve 17a and the check valve 17b are examples of a "first check valve" and a "second check valve", respectively.

According to the first preferred embodiment, bypass valves 18a and 18b are provided in the bypass passages 15b and 15c, respectively. The bypass valve 18a adjusts the amount of compressed and cooled air to be supplied to the engine 11 of the outboard motor 10 through the main passage 15a by adjusting the amount of air that flows through the bypass passage 15b. The bypass valve 18b adjusts the amount of compressed and cooled air to be supplied to the engine 21 of the outboard motor 20 and the engine 31 of the outboard motor 30 through the branch passage 41 by adjusting the amount of air that flows through the bypass passage 15c. The bypass valve 18a is an example of an "air distributor", a "regulator valve", or a "first regulator valve", and the bypass valve 18b is an example of an "air distributor", a "regulator valve", or a "second regulator valve".

The compressed and cooled air that flows through a portion downstream of the connection position C3 in the branch passage 41 is supplied (distributed) to the engine 21 of the outboard motor 20 and the engine 31 of the outboard motor 30 through the re-branch passages 42 and 43, respectively. A first end of the re-branch passage 42 and a first end of the re-branch passage 43 are preferably connected to the branch passage 41 outside the outboard motors 10, 20, and 30. A second end of the re-branch passage 42 is preferably connected to the engine 21 inside the cowling 22. A second end of the re-branch passage 43 is preferably connected to the engine 31 inside the cowling 32.

Consequently, in the outboard motor unit 1, the opening degree of the throttle body 14a is adjusted by the ECU 13 such that the amount of air to be introduced into the main passage 15a is adjusted. The air introduced into the main passage 15a and the air introduced into the branch passage 41 are compressed and cooled by the supercharger 16 and the intercooler 14b.

In the outboard motor unit 1, the opening degree of the bypass valve 18a and the opening degree of the bypass valve 18b are adjusted by the ECU 13 such that the low-temperature compressed air is distributed to the engines 11, 21, and 31. Specifically, in the outboard motor unit 1, the opening degree of the bypass valve 18a and the opening degree of the bypass valve 18b are adjusted by the ECU 13 such that the amount of low-temperature compressed air that flows through a portion downstream of the connection position C1 in the main passage 15a and the amount of low-temperature compressed air that flows through the branch passage 41 are adjusted. Furthermore, the opening degree of the bypass valve 18a and the opening degree of the bypass valve 18b are adjusted by the ECU 13 such that the amount of low-temperature compressed air that flows through a portion downstream of the connection position C2 in the main passage 15a and the amount of low-temperature compressed air that flows through the portion downstream of the connection position C3 in the branch passage 41 are adjusted. Consequently, the opening degree of the bypass valve 18a and the opening degree of the bypass valve 18b are adjusted by the ECU 13 such that the amount of low-temperature compressed air that flows through the air passage 40 is adjusted.

The opening degree of the throttle body 14a, the opening degree of the bypass valve 18a, and the opening degree of the bypass valve 18b are controlled by the ECU 13 based on the operating conditions of the engines 11, 21, and 31. The ECU 13 receives the operating condition of each of the engines 21 and 31 based on the operating condition of the engine 21 and the operating condition of the engine 31 transmitted from the ECUs 23 and 33, respectively.

The low-temperature compressed air that flows through the portion downstream of the connection position C2 in the main passage 15a is supplied to the engine 11 of the outboard motor 10. The low-temperature compressed air that flows through the portion downstream of the connection position C3 in the branch passage 41 is supplied to the engine 21 of the outboard motor 20 and the engine 31 of the outboard motor 30 through the re-branch passages 42 and 43, respectively. Generally, the amount of compressed air to be supplied to the engine 11, which is required to drive the supercharger 16, is preferably larger than the amount of compressed air to be supplied to the engines 21 and 31, which are not required to drive a supercharger.

Figure 3:
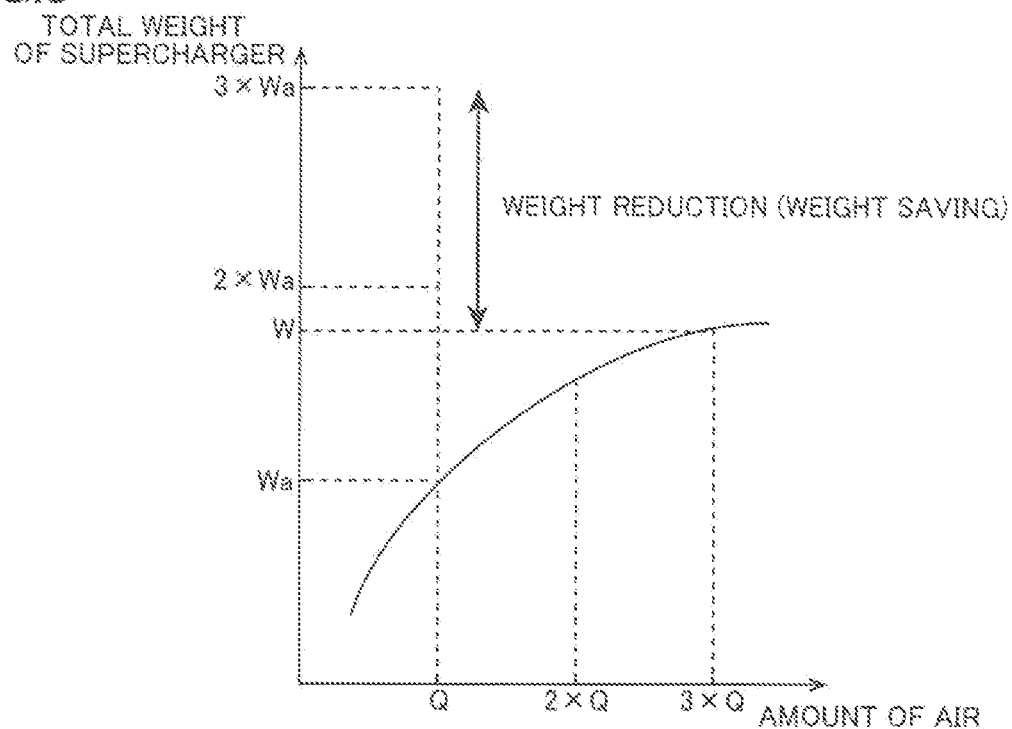
FIG. 3 is a graph illustrating the relationship between the amount of air and the weight of a supercharger in the outboard motor unit according to the first preferred embodiment of the present invention.

Weight reduction in the outboard motor unit 1 is now described with reference to FIG. 3. In each of the three engines of the three outboard motors, the amount of air to be generated from the supercharger in order to demonstrate the desired engine performance at a predetermined supercharging pressure is Q. The weight of one supercharger that generates the amount of air Q is Wa.

In general, when the amount of air that corresponds to the predetermined supercharging pressure increases, the weight of the supercharger increases. However, the degree of increase in the weight of the supercharger decreases as the amount of air increases. That is, the weight of the supercharger logarithmically increases. Therefore, as compared with the total weight (=3×Wa) of the superchargers in the case where the supercharger that generates the amount of air Q is provided in each of the three outboard motors, as in the first preferred embodiment, the supercharger that generates the amount of air (3×Q) (the supercharger that generates the amount of air that three superchargers generate) is provided in only one of the three outboard motors but no supercharger is provided in the remaining two outboard motors such that the total weight (=W) of the superchargers is reduced, as shown in FIG. 3. Consequently, the weight of the entire outboard motor unit 1 is reduced to reduce the weight of the marine vessel 100.

According to the first preferred embodiment of the present invention, the following advantageous effects are obtained.

According to the first preferred embodiment of the present invention, the outboard motor unit 1 includes the air passage 40 through which the air compressed by the supercharger 16 of the outboard motor 10 is supplied to the engine 21 of the outboard motor 20. Thus, the compressed air is supplied from the supercharger 16 of the outboard motor 10 to the engine 21 of the outboard motor 20 without providing the supercharger 16 in the outboard motor 20, and hence the outboard motor 20 is reduced in size and weight as compared with the case where the supercharger 16 is provided in the outboard motor 20. Consequently, an increase in the size and weight of the outboard motor unit 1 including the outboard motor 10 and the outboard motor 20 is significantly reduced or prevented while compressed air is supplied to both the engine 11 of the outboard motor 10 and the engine 21 of the outboard motor 20.

According to the first preferred embodiment of the present invention, in the outboard motor unit 1, the intercooler 14b that cools the air compressed by the supercharger 16 is provided downstream of the supercharger 16, and the air compressed and cooled by the supercharger 16 and the intercooler 14b is supplied to the engine 11 of the outboard motor 10 and the engine 21 of the outboard motor 20. Thus, the compressed air is cooled by the intercooler 14b such that the density of the compressed air to be introduced into the engine 11 and the engine 21 is increased, and hence the drive force (engine performance) of the engine 11 and the engine 21 is increased. In addition, the intercooler 14b is shared by the outboard motors 10 and 20, and hence an increase in the size and weight of the outboard motor unit 1 is further significantly reduced or prevented.

According to the first preferred embodiment of the present invention, the outboard motor unit 1 includes the ECU 13 and the bypass valves 18a and 18b that distribute the air compressed by the supercharger 16 of the outboard motor 10 to the engine 11 and the engine 21. Thus, an appropriate amount of air is supplied to the engine 11 and the engine 21 by the ECU 13 and the bypass valves 18a and 18b. Consequently, the drive force of the outboard motor 10 and the drive force of the outboard motor 20 are appropriately controlled.

According to the first preferred embodiment of the present invention, the bypass valves 18a and 18b that adjust the amount of compressed air that flows through the air passage 40 and the ECU 13 that adjusts the opening degree of the bypass valves 18a and 18b are provided. Thus, the drive force of the outboard motor 10 and the drive force of the outboard motor 20 are more appropriately controlled by the bypass valves 18a and 18b and the ECU 13.

According to the first preferred embodiment of the present invention, the opening degree of the bypass valves 18a and 18b is adjusted by the ECU 13 that is provided in the outboard motor 10 and controls the driving of the engine 11. Thus, the ECU 13 that controls the driving of the engine 11 also functions as an opening degree controller that adjusts the opening degree of the bypass valves 18a and 18b such that the number of components in the outboard motor unit 1 is reduced as compared with the case where the opening degree controller is provided separately from the ECU 13 that controls the driving of the engine 11.

According to the first preferred embodiment of the present invention, the ECU 13 adjusts the opening degree of the bypass valves 18a and 18b based on the operating condition of the engine 11 and the operating condition of the engine 21 transmitted from the ECU 23. Thus, an appropriate amount of air is supplied to the engine 11 and the engine 21 to correspond to the operating condition of the engine 11 and the operating condition of the engine 21, respectively. Consequently, the drive force of the outboard motor 10 and the drive force of the outboard motor 20 are more appropriately controlled.

According to the first preferred embodiment of the present invention, the air compressed by the supercharger 16 of the outboard motor 10 is supplied not only to the engine 21 of the outboard motor 20 but also to the engine 31 of the outboard motor 30 through the air passage 40. Thus, the compressed air is supplied from the supercharger 16 of the outboard motor 10 to the engine 21 of the outboard motor 20 and the engine 31 of the outboard motor 30 without providing a supercharger in the outboard motors 20 and 30, and hence the outboard motors 20 and 30 are reduced in size and weight as compared with the case where a supercharger is provided in the outboard motors 20 and 30. Consequently, an increase in the size and weight of the outboard motor unit 1 including the outboard motors 10, 20, and 30 is significantly reduced or prevented while compressed air is supplied to each of the engine 11 of the outboard motor 10, the engine 21 of the outboard motor 20, and the engine 31 of the outboard motor 30.

According to the first preferred embodiment of the present invention, the outboard motor 10 is located between the outboard motors 20 and 30 such that the compressed air is easily distributed to the outboard motor 20 and the outboard motor 30 through the air passage 40.

According to the first preferred embodiment of the present invention, the outboard motor 10 includes the main passage 15a through which the air compressed by the supercharger 16 is supplied to the engine 11 and the branch passage 41 connected to the portion of the main passage 15a downstream of the supercharger 16. Thus, the compressed air that flows through the main passage is easily supplied to the engine 21 of the outboard motor 20 through the branch passage 41.

According to the first preferred embodiment of the present invention, the air compressed and cooled by the supercharger 16 and the intercooler 14b is supplied from the outboard motor 10 to the engine 11 of the outboard motor 10 and the engine 21 of the outboard motor 20. Thus, it is not necessary to provide an intercooler in the outboard motor 20, and hence the outboard motor 20 is further reduced in size and weight. Consequently, an increase in the size and weight of the outboard motor unit 1 is further significantly reduced or prevented. Furthermore, the intercooler 14b that cools the air compressed by the supercharger 16 is provided in the outboard motor 10 such that the density of the compressed air to be supplied to the engine 11 and the engine 21 is increased. Consequently, the drive force (engine performance) of the engine 11 and the engine 21 is increased.

According to the first preferred embodiment of the present invention, the bypass valve 18a that adjusts the amount of compressed air that flows through the air passage 40 by adjusting the flow of air in the bypass passage 15b is provided in the bypass passage 15b. Furthermore, the ECU 13 that adjusts the opening degree of the bypass valve 18a is provided in the outboard motor unit 1. Thus, the opening degree of the bypass valve 18a provided in the bypass passage 15b is adjusted such that the drive force of the outboard motor 10 is appropriately controlled. In addition, the bypass valve 18a is opened to allow excessively compressed air to escape through the bypass passage 15b. Thus, any supply of excessively compressed air to the engine 11 is significantly reduced or prevented.

According to the first preferred embodiment of the present invention, both the bypass passage 15b and the bypass valve 18a are provided inside the cowling 12 of the outboard motor 10. Thus, the bypass passage 15b is located in the vicinity of the supercharger 16, and hence the bypass passage 15b is easily shortened.

According to the first preferred embodiment of the present invention, the opening degree of the bypass valve 18b that is provided in the bypass passage 15c and adjusts the amount of compressed air that flows through the air passage 40 by adjusting flow of air in the bypass passage 15c is adjusted by the ECU 13. Thus, in addition to the opening degree of the bypass valve 18a provided in the bypass passage 15b, the opening degree of the bypass valve 18b provided in the bypass passage 15c is adjusted such that not only the drive force of the outboard motor 10 but also the drive force of the outboard motor 20 is appropriately controlled. Furthermore, the bypass valve 18b is opened to allow excessively compressed air to escape through the bypass passage 15c. Thus, any supply of the excessively compressed air to the engine 21 is significantly reduced or prevented.

According to the first preferred embodiment of the present invention, the ECU 13 adjusts the opening degree of the bypass valve 18a and the opening degree of the bypass valve 18b based on the operating condition of the engine 11 and the operating condition of the engine 21 transmitted from the ECU 23. Thus, the opening degree of the bypass valve 18a and the opening degree of the bypass valve 18b are adjusted to correspond to the operating condition of the engine 11 and the operating condition of the engine 21 such that an appropriate amount of air is supplied to each of the engine 11 and the engine 21. Consequently, the drive force of the outboard motor 10 and the drive force of the outboard motor 20 are more appropriately controlled.

According to the first preferred embodiment of the present invention, the check valve 17a that prevents backflow of the compressed air is provided in the main passage 15a upstream of the connection position C2 between the main passage 15a and the bypass passage 15b and downstream of the connection position C1 between the branch passage 41 and the main passage 15a. Thus, the backflow of compressed air is prevented by the check valve 17a such that the amount of air to be supplied to the engine 11 of the compressed air that has passed through the check valve 17a is reliably controlled by the bypass valve 18a.

According to the first preferred embodiment of the present invention, the check valve 17b that prevents backflow of the compressed air is provided in the branch passage 41 upstream of the connection position C3 between the branch passage 41 and the bypass passage 15c and downstream of the connection position C1 between the branch passage 41 and the main passage 15a. Thus, the backflow of compressed air is prevented by the check valve 17b such that the amount of air to be supplied to the engine 21 of the compressed air that has passed through the check valve 17b is reliably controlled by the bypass valve 18b.

According to the first preferred embodiment of the present invention, both the check valve 17a and the check valve 17b preferably are provided inside the cowling 12 of the outboard motor 10. Thus, the check valve 17a and the check valve 17b are located in the vicinity of the connection position C1 between the branch passage 41 and the main passage 15a, and hence the main passage 15a and the branch passage 41 are easily shortened.

According to the first preferred embodiment of the present invention, both the bypass passage 15c and the bypass valve 18b preferably are provided inside the cowling 12 of the outboard motor 10. Thus, the bypass passage 15c is located in the vicinity of the supercharger 16, and hence the bypass passage 15c is easily shortened.

Second Preferred Embodiment

The structure of a marine vessel 200 including an outboard motor unit 101 according to a second preferred embodiment of the present invention is now described with reference to FIGS. 4 and 5. In the outboard motor unit 101 according to the second preferred embodiment, intercoolers 124 and 134 are respectively provided in outboard motors 120 and 130 that do not include a supercharger, unlike the outboard motor unit 1 according to the first preferred embodiment. In the second preferred embodiment, the same structures as those of the first preferred embodiment are denoted by the same reference numerals in order to omit description thereof. In FIG. 5, communication is indicated by two-dot chain lines.

Figure 4:
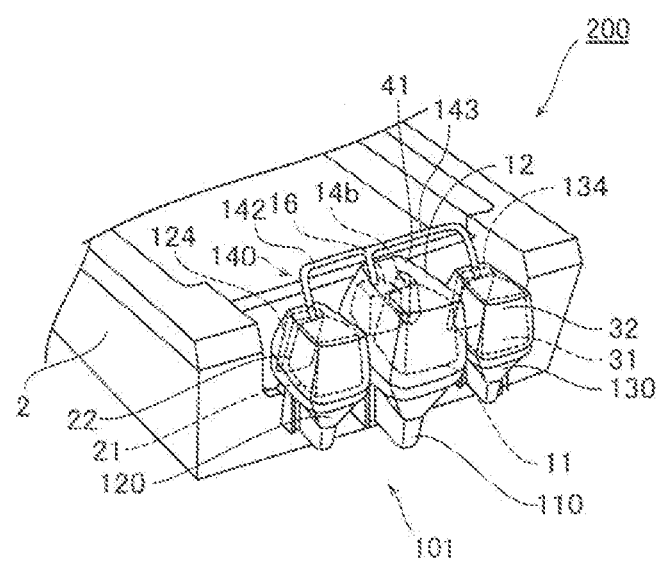
FIG. 4 is a perspective view schematically showing a portion of a marine vessel including an outboard motor unit according to a second preferred embodiment of the present invention.
Figure 5:
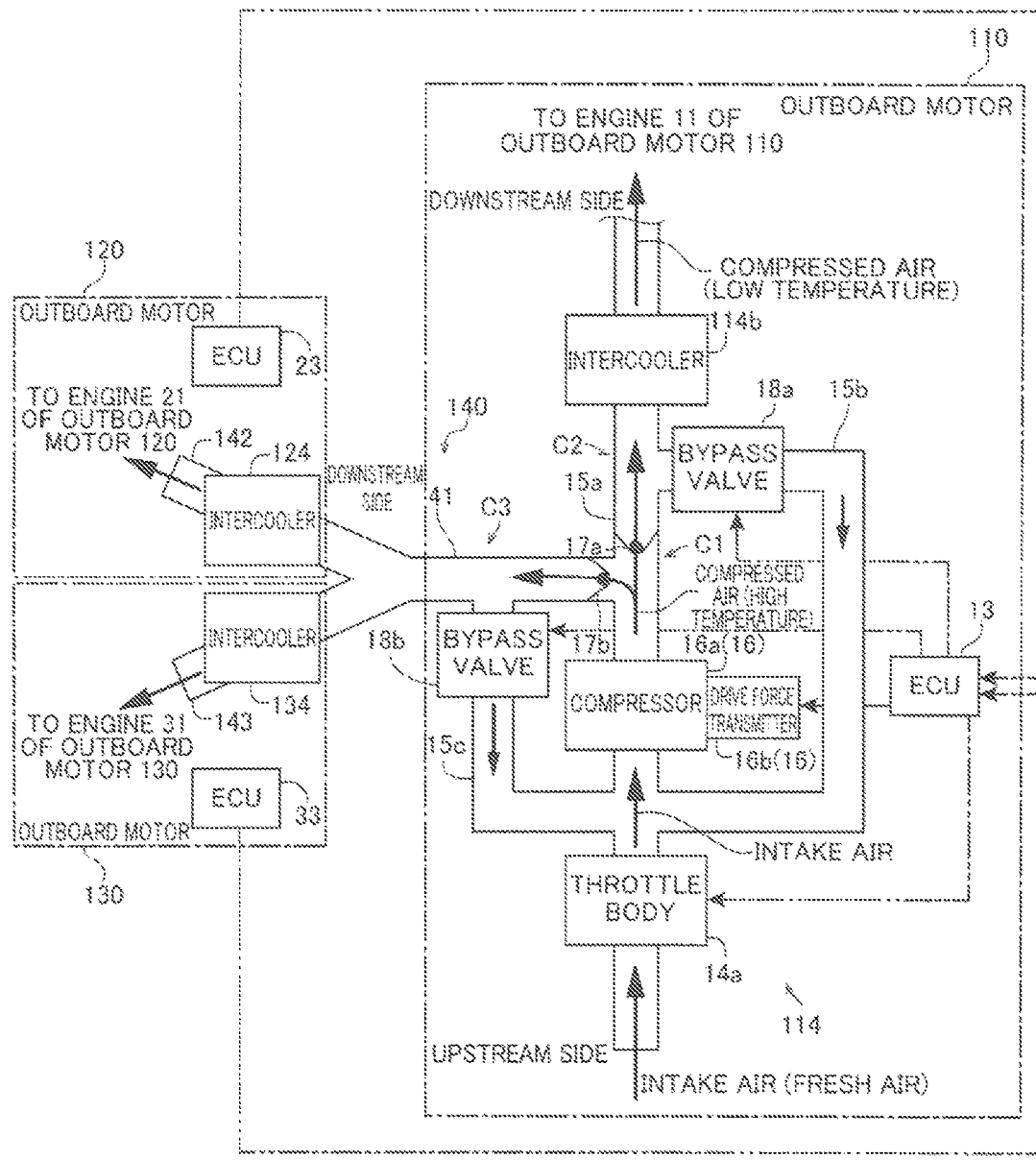
FIG. 5 is a diagram schematically showing the outboard motor unit according to the second preferred embodiment of the present invention.

As shown in FIG. 4, the marine vessel 200 includes the outboard motor unit 101 including a plurality of (three) outboard motors 110, 120, and 130. The outboard motors 110, 120, and 130 are examples of a "first outboard motor", a "second outboard motor", and a "third outboard motor", respectively.

The outboard motor unit 101 includes the outboard motors 110, 120, and 130 and an air passage 140.

An air intake 114 of the outboard motor 110 includes a supercharger 16 and an intercooler 114b located inside a cowling 12. The outboard motor 120 includes the intercooler 124 that is located inside a cowling 22 and cools compressed air supplied from the supercharger 16. The outboard motor 130 includes the intercooler 134 that is located inside a cowling 32 and cools compressed air supplied from the supercharger 16. The intercooler 114b is an example of a "cooler" or a "first cooler", and the intercooler 124 is an example of a "cooler" or a "second cooler".

The air passage 140 includes a branch passage 41 that passes through the cowling 12 of the outboard motor 10 and re-branch passages 142 and 143 that pass through the cowling 22 of the outboard motor 120 and the cowling 32 of the outboard motor 130, respectively. The branch passage 41 branches into two to create the re-branch passages 142 and 143.

As shown in FIG. 5, the intercooler 114b is located downstream of a connection position C2 between a main passage 15a and a bypass passage 15b in the main passage 15a (downstream of the supercharger 16). The intercooler 124 is located in the re-branch passage 142 inside the cowling 22. The intercooler 134 is located in the re-branch passage 143 inside the cowling 32. Thus, in the outboard motor unit 101 according to the second preferred embodiment, compressed air before cooling is distributed to the main passage 15a and the branch passage 41 by an ECU 13 and bypass valves 18a and 18b. The compressed air after the distribution (high-temperature compressed air) is cooled by the intercoolers 114b, 124, and 134 provided in the outboard motors 110, 120, and 130, and then is supplied to the engines 11, 21 and 31, respectively. The remaining structures of the second preferred embodiment are preferably similar to those of the first preferred embodiment.

According to the second preferred embodiment of the present invention, the following advantageous effects are obtained.

According to the second preferred embodiment of the present invention, the outboard motor unit 101 includes the air passage 140 through which the air compressed by the supercharger 16 of the outboard motor 110 is supplied to the engine 21 of the outboard motor 120. Thus, similarly to the first preferred embodiment, an increase in the size and weight of the outboard motor unit 101 including the outboard motor 110 and the outboard motor 120 is significantly reduced or prevented while compressed air is supplied to both the engine 11 of the outboard motor 110 and the engine 21 of the outboard motor 120.

According to the second preferred embodiment of the present invention, the intercooler 114b that is provided downstream of the supercharger 16 inside the cowling 12 and cools the air compressed by the supercharger 16 and the intercooler 124 that is provided inside the cowling 22 and cools the compressed air supplied from the supercharger 16 of the outboard motor 110 are provided in the outboard motor unit 101. Thus, the compressed air to be supplied to the engines 11 and 21 is sufficiently cooled by the intercooler 114b and the intercooler 124 without increasing the size of the intercooler 114b to sufficiently cool the compressed air. Furthermore, the intercooler 124 is provided inside the cowling 22 in which the engine 21 is located such that the air cooled by the intercooler 124 is quickly supplied to the engine 21, and hence warming of the cooled air due to the surrounding environment or the like is significantly reduced or prevented. Consequently, the density of the air to be supplied to the engine 21 is reliably increased. The remaining advantageous effects of the second preferred embodiment are similar to those of the first preferred embodiment.

The preferred embodiments of the present invention described above are illustrative in all points and not restrictive. The extent of the present invention is not defined by the above description of the preferred embodiments but by the scope of the claims, and all modifications within the meaning and range equivalent to the scope of the claims are further included.

For example, while the outboard motor unit 1 (101) preferably includes one outboard motor 10 (110) (first outboard motor) including the supercharger 16 and the two outboard motors 20 and 30 (120 and 130) (second and third outboard motors) that do not include a supercharger in each of the first and second preferred embodiments described above, the present invention is not restricted to this. It is only required that the outboard motor unit includes at least one first outboard motor including the supercharger and at least one second outboard motor that does not include a supercharger.

Figure 6:
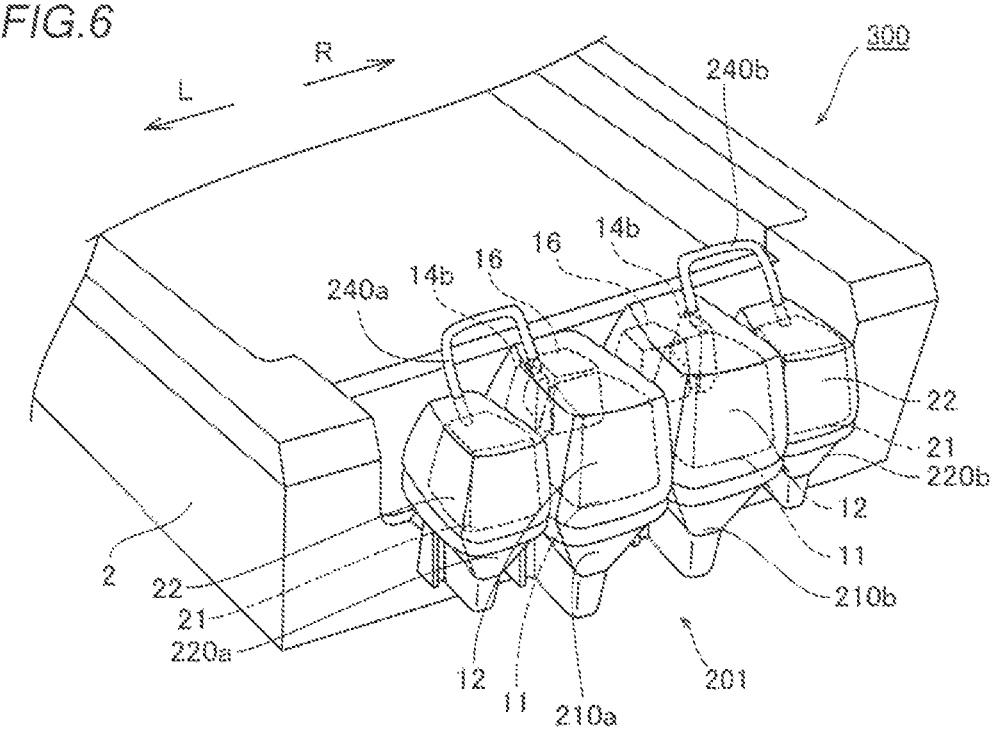
FIG. 6 is a perspective view schematically showing a portion of a marine vessel including an outboard motor unit according to a first modification of the first preferred embodiment of the present invention.

For example, as in a marine vessel 300 according to a first modification of the first preferred embodiment shown in FIG. 6, an outboard motor unit 201 may include two outboard motors 210a and 210b each including both a supercharger 16 and an intercooler 14b located inside a cowling 12 and two outboard motors 220a and 220b each including no supercharger or intercooler. The outboard motors 210a and 210b are examples of a "first outboard motor", and the outboard motors 220a and 220b are examples of a "second outboard motor".

In this case, in the outboard motor unit 201, the outboard motor 220a is located on the port side with respect to the outboard motors 210a and 210b and the outboard motor 220b is located on the starboard side with respect to the outboard motors 210a and 210b to sandwich the outboard motors 210a and 210b therebetween. The outboard motor unit 201 further includes an air passage 240a through which air compressed by the supercharger 16 of the outboard motor 210a is supplied to an engine 21 of the outboard motor 220a and an air passage 240b through which air compressed by the supercharger 16 of the outboard motor 210b is supplied to an engine 21 of the outboard motor 220b.

Figure 7:
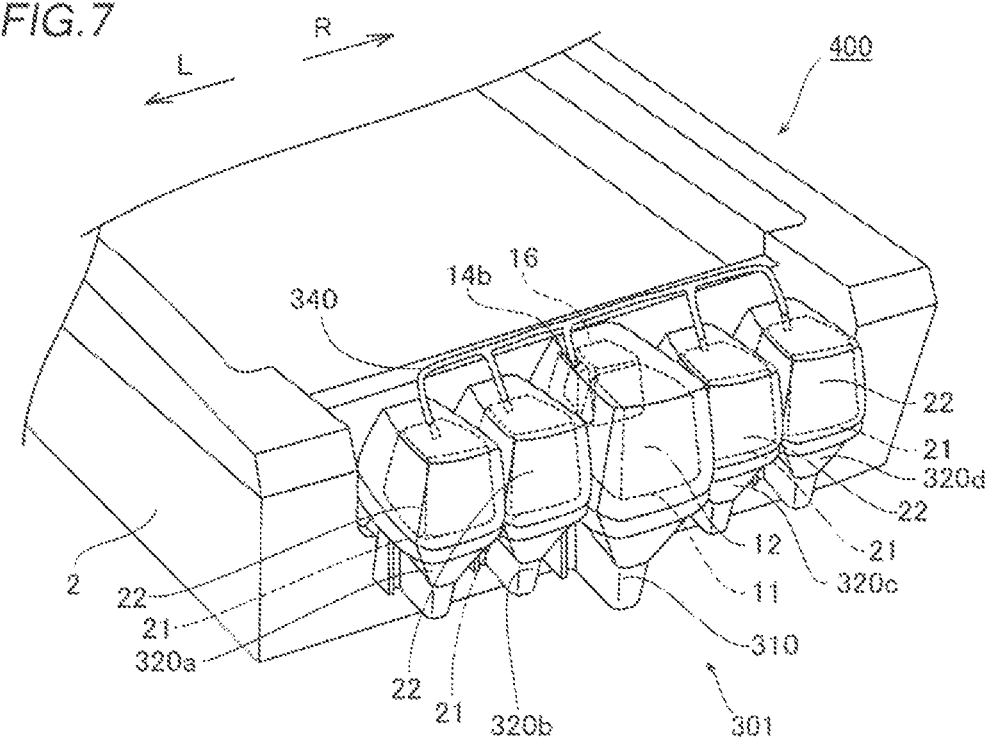
FIG. 7 is a perspective view schematically showing a portion of a marine vessel including an outboard motor unit according to a second modification of the first preferred embodiment of the present invention.

For example, as in a marine vessel 400 according to a second modification of the first preferred embodiment shown in FIG. 7, an outboard motor unit 301 may include one outboard motor 310 including both a supercharger 16 and an intercooler 14b located inside a cowling 12 and four outboard motors 320a, 320b, 320c, and 320d that do not include a supercharger or an intercooler. The outboard motor 310 is an example of a "first outboard motor", and the outboard motors 320a, 320b, 320c, and 320d are examples of a "second outboard motor".

In this case, in the outboard motor unit 301, the outboard motors 320a and 320b are located on the port side with respect to the outboard motor 310 and the outboard motors 320c and 320d are located on the starboard side with respect to the outboard motor 310 to sandwich the outboard motor 310 therebetween. The outboard motor unit 301 further includes an air passage 340 through which air compressed by the supercharger 16 of the outboard motor 310 is supplied to engines 21 of the outboard motors 320a to 320d.

While the amount of air that flows through the main passage 15a and the branch passage 41 is preferably adjusted by the bypass valves 18a and 18b (first and second regulator valves) in each of the first and second preferred embodiments described above, the present invention is not restricted to this. The amount of air that flows through the main passage and the branch passage may alternatively be adjusted by valves, members, mechanisms or the like other than the bypass valves.

While the check valves 17a and 17b (first and second check valves) are preferably included in each of the first and second preferred embodiments described above, for example, the present invention is not restricted to this. The first check valve and the second check valve may not be used. When the structure including no first check valve or second check valve is applied to the structure of the first preferred embodiment shown in FIG. 2 and the structure of the second preferred embodiment shown in FIG. 5, a main passage side bypass system including the bypass valve 18a and the bypass passage 15b and a branch passage side bypass system including the bypass valve 18b and the bypass passage 15c are integrated into one of the bypass systems.

While the outboard motor 20 (120) (second outboard motor) and the outboard motor 30 (130) (third outboard motor) including no supercharger preferably sandwich the outboard motor (110) (first outboard motor) including the supercharger 16 in each of the first and second preferred embodiments described above, the present invention is not restricted to this. The first outboard motor may not be sandwiched between the second outboard motor and the third outboard motor.

While neither of the two outboard motors 20 (second outboard motor) and 30 (third outboard motor) including no supercharger preferably includes an intercooler in the first preferred embodiment described above, and the two outboard motors 120 (second outboard motor) and 130 (third outboard motor) including no supercharger preferably include the intercoolers 124 and 134, respectively, in the second preferred embodiment described above, the present invention is not restricted to this. The outboard motor unit may alternatively include both a second outboard motor including no supercharger or intercooler and a second outboard motor including no supercharger but including an intercooler.

While the marine vessel 100 (200) preferably includes the outboard motor unit 1 (101) that includes the outboard motor (110) including the supercharger 16 and the two outboard motors 20 (120) (second outboard motor) and 30 (130) (third outboard motor) including no supercharger in each of the first and second preferred embodiments described above, the present invention is not restricted to this. The marine vessel may alternatively include an outboard motor not included in an outboard motor unit. In other words, the marine vessel may include an outboard motor that includes a supercharger and supplies no compressed air to other outboard motors, or may include an outboard motor including no supercharger, to which no compressed air is supplied from other outboard motors.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An outboard motor unit comprising:
 a first outboard motor including a first cowling, a first engine housed in the first cowling, and a supercharger inside the first cowling and that supplies compressed air to the first engine;
 a second outboard motor including a second cowling and a second engine housed in the second cowling; and
 an air passage through which the air compressed by the supercharger of the first outboard motor is supplied to the second engine of the second outboard motor; wherein
 the first outboard motor includes a main passage through which the compressed air compressed by the supercharger is supplied to the first engine;
 the air passage includes:
  an exposed portion that is exposed outside of the first cowling and the second cowling; and
  a branch passage that is provided inside of the first cowling and branches from a portion of the main passage downstream of the supercharger; and
 the first outboard motor and the second outboard motor are connected to each other by the exposed portion.

2. The outboard motor unit according to claim 1, further comprising a cooler downstream of the supercharger and that cools the air compressed by the supercharger; wherein
 the air compressed by the supercharger and cooled by the cooler is supplied to the first engine of the first outboard motor and the second engine of the second outboard motor.

3. The outboard motor unit according to claim 1, further comprising an air distributor that distributes the air compressed by the supercharger of the first outboard motor to the first engine and the second engine.

4. The outboard motor unit according to claim 3, wherein the air distributor includes a regulator valve that adjusts an amount of the compressed air that flows through the air passage and an opening degree controller that adjusts an opening degree of the regulator valve.

5. The outboard motor unit according to claim 4, further comprising a first controller in the first outboard motor that is configured or programmed to control driving of the first engine, wherein the first controller includes the opening degree controller.

6. The outboard motor unit according to claim 5, wherein
 the second outboard motor further includes a second controller configured or programmed to communicate with the first controller and to control driving of the second engine; and
 the first controller is configured or programmed to adjust the opening degree of the regulator valve based on an operating condition of the first engine and an operating condition of the second engine transmitted from the second controller.

7. The outboard motor unit according to claim 1, further comprising a third outboard motor including a third cowling and a third engine housed in the third cowling; wherein
 the air compressed by the supercharger of the first outboard motor is supplied to the second engine of the second outboard motor and to theengine of the third outboard motor through the air passage.

8. The outboard motor unit according to claim 7, wherein the first outboard motor is located between the second outboard motor and the third outboard motor.

9. The outboard motor unit according to claim 1, further comprising a cooler that cools the air compressed by the supercharger and is located upstream of a connection position between the branch passage and the main passage and downstream of the supercharger in the main passage inside the first cowling; wherein the air compressed by the supercharger and cooled by the cooler is supplied to the first engine of the first outboard motor and the second engine of the second outboard motor.

10. The outboard motor unit according to claim 9, further comprising:
an air distributor that distributes the air compressed by the supercharger of the first outboard motor to the first engine and the second engine; and
a first bypass passage that connects a portion of the main passage downstream of the cooler to a portion of the main passage upstream of the supercharger and returns the air compressed by the supercharger to the supercharger; wherein
the air distributor includes a first regulator valve in the first bypass passage and that adjusts an amount of the compressed air that flows through the air passage by adjusting a flow of the air in the first bypass passage and an opening degree controller that adjusts an opening degree of the first regulator valve.

11. The outboard motor unit according to claim 10, wherein both the first bypass passage and the first regulator valve are provided inside the first cowling of the first outboard motor.

12. The outboard motor unit according to claim 10, further comprising a second bypass passage that connects the branch passage to the portion of the main passage upstream of the supercharger and returns the air compressed by the supercharger to the supercharger; wherein
the air distributor includes a second regulator valve in the second bypass passage and that adjusts the amount of the compressed air that flows through the air passage by adjusting a flow of the air in the second bypass passage; and
an opening degree of the second regulator valve is adjusted by the opening degree controller.

13. The outboard motor unit according to claim 12, further comprising a first controller in the first outboard motor that is configured or programmed to control driving of the first engine; wherein
the first controller includes the opening degree controller;
the second outboard motor further includes a second controller configured or programmed to communicate with the first controller and to control driving of the second engine; and
the first controller is configured or programmed to adjust the opening degree of the first regulator valve and the opening degree of the second regulator valve based on an operating condition of the first engine and an operating condition of the second engine transmitted from the second controller.

14. The outboard motor unit according to claim 12, further comprising:
a first check valve in the main passage that prevents backflow of the compressed air and is located upstream of a connection position between the main passage and the first bypass passage and downstream of the connection position between the branch passage and the main passage; and
a second check valve in the branch passage that prevents backflow of the compressed air and is located upstream of a connection position between the branch passage and the second bypass passage and downstream of the connection position between the branch passage and the main passage.

15. The outboard motor unit according to claim 14, wherein both the first check valve and the second check valve are provided inside the first cowling of the first outboard motor.

16. The outboard motor unit according to claim 12, wherein both the second bypass passage and the second regulator valve are provided inside the first cowling of the first outboard motor.

17. The outboard motor unit according to claim 2, wherein the cooler includes a first cooler downstream of the supercharger in the first cowling and that cools the air compressed by the supercharger and a second cooler in the second cowling that cools the compressed air supplied from the supercharger of the first outboard motor.

18. A marine vessel comprising:
a vessel body; and
an outboard motor unit mounted on the vessel body, the outboard motor unit including:
a first outboard motor including a first cowling, a first engine housed in the first cowling, and a supercharger inside the first cowling and that supplies compressed air to the first engine;
a second outboard motor including a second cowling and a second engine housed in the second cowling; and
an air passage through which the air compressed by the supercharger of the first outboard motor is supplied to the second engine of the second outboard motor; wherein
the first outboard motor includes a main passage through which the compressed air compressed by the supercharger is supplied to the first engine;
the air passage includes:
an exposed portion that is exposed outside of the first cowling and the second cowling; and
a branch passage that is provided inside of the first cowling and branches from a portion of the main passage downstream of the supercharger; and
the first outboard motor and the second outboard motor are connected to each other by the exposed portion.

19. The marine vessel according to claim 18, wherein
the outboard motor unit further includes a cooler downstream of the supercharger and that cools the air compressed by the supercharger; and
the air compressed by the supercharger and cooled by the cooler is supplied to the first engine of the first outboard motor and the second engine of the second outboard motor.

20. The outboard motor unit according to claim 1, wherein the exposed portion is flexibly deformable.

* * * * *